United States Patent [19]

Moebus

[11] Patent Number: 4,581,983

[45] Date of Patent: Apr. 15, 1986

[54] PISTON FOR INTERNAL COMBUSTION ENGINES

[75] Inventor: Horst Moebus, Neckarsulm, Fed. Rep. of Germany

[73] Assignee: Karl Schmidt GmbH, Neckarsulm, Fed. Rep. of Germany

[21] Appl. No.: 147,448

[22] Filed: May 7, 1980

[30] Foreign Application Priority Data

May 16, 1979 [DE] Fed. Rep. of Germany ....... 2919638

[51] Int. Cl.⁴ .................. B23P 15/10; F01B 31/08; B23K 15/00; F16J 1/00
[52] U.S. Cl. .................... 92/186; 29/156.5 R; 92/222; 92/231; 92/260; 123/41.35; 123/193 P; 219/121 EC; 219/121 ED
[58] Field of Search ............. 123/193 P, 41.35, 41.38; 92/186, 222, 231, 260; 29/156.5 R; 219/121 EC, 121 ED

[56] References Cited

U.S. PATENT DOCUMENTS

| | | | |
|---|---|---|---|
| 2,340,662 | 2/1944 | Hazzard ................... | 92/231 |
| 3,189,010 | 6/1965 | Isley ....................... | 92/222 X |
| 3,190,273 | 6/1965 | Bachle et al. .......... | 92/231 X |
| 3,349,672 | 10/1967 | Meier et al. ........... | 92/231 |
| 3,613,521 | 10/1971 | Itano ....................... | 92/231 X |
| 3,914,574 | 10/1975 | Hill et al. ............... | 92/260 X |

FOREIGN PATENT DOCUMENTS 2127040  10/1972  France .

*Primary Examiner*—G. L. Walton
*Attorney, Agent, or Firm*—Sprung Horn Kramer & Woods

[57] ABSTRACT

In a cooled composite piston having a cooling passage adjacent to the interface and a method of making same, the upper part consists of forged steel and is formed on its underside with ribs bearing on mating surfaces of the lower part. To improve the resistance to thermal and mechanical stresses, the upper part has been welded by means of charge carrier rays to the lower part, which consists of cast ferrous material.

6 Claims, 1 Drawing Figure

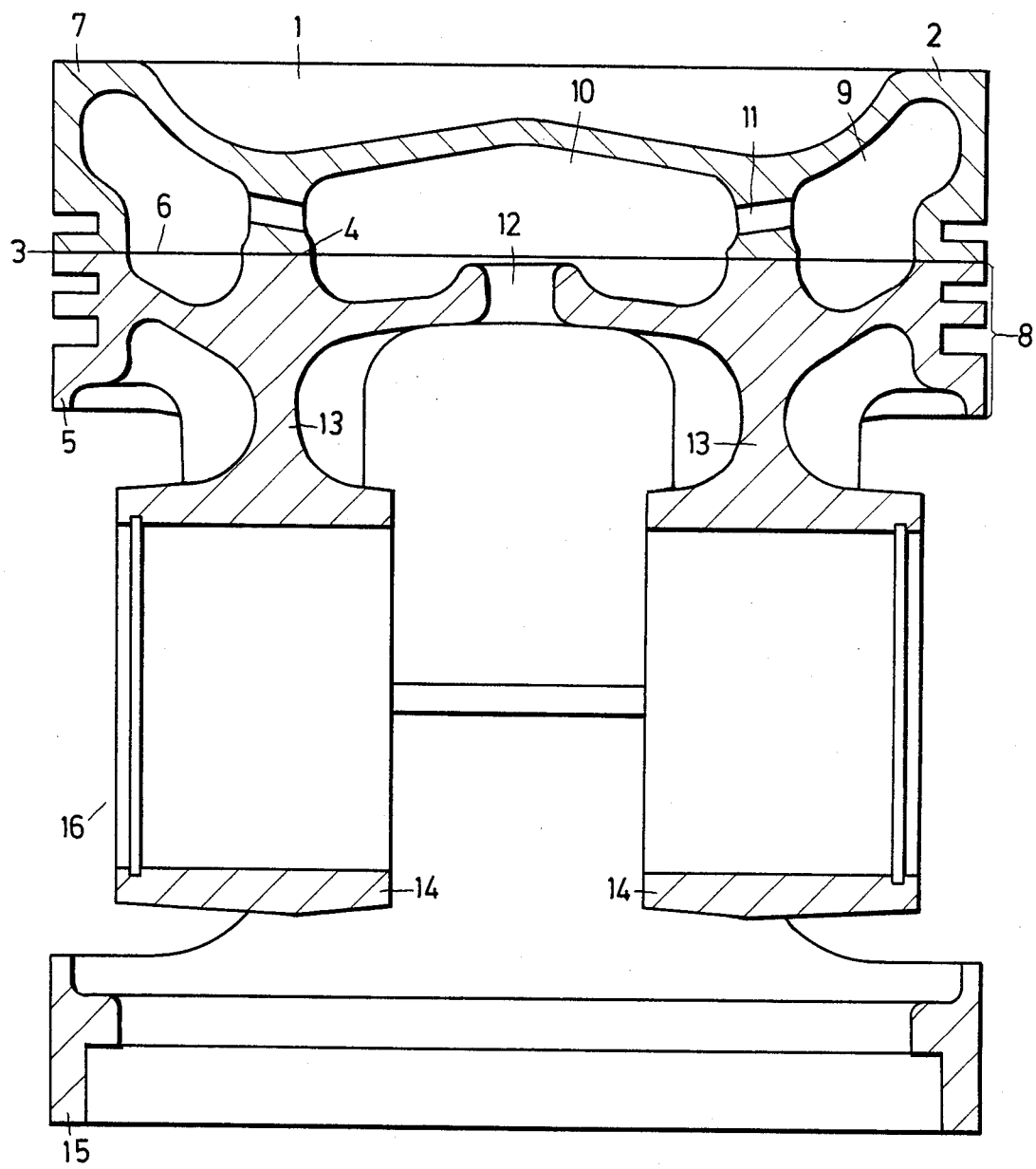

PISTON FOR INTERNAL COMBUSTION ENGINES

BACKGROUND OF THE INVENTION

The present invention relates to a piston for internal combustion engines, particularly for high-speed, high-duty diesel engines and a method of making same, which comprises an upper part and a lower part and is formed adjacent to the interface between these parts, with one or more cooling passages and in which the upper part consists of forged steel and is formed on its underside with ribs bearing on opposite surfaces of the lower part.

Three types of pistons are generally used at present in internal-combustion engines:
(a) Cast or forged, integral pistons of light alloys;
(b) Composite pistons having an upper part made of ferrous material and a lower part made of a light alloy;
(c) Integral pistons cast of ferrous material.

In the present four-stroke cycle diesel engines, the use of integral light alloy pistons is decreasing because light alloys when used alone can no longer meet the increasing requirements for modern engines as regards a continuous increase in power, poorer fuel qualities and longer life. For this reason the pistons of the two other types will mainly be used in the engines being developed for the 1980's.

In such engines, the higher combustion pressures and combustion temperatures must be matched with the existing technological possibilities which depend on the material and its processing and last, but not least, on economic considerations. These facts usually result in agreement with the engine manufacturer in a compromise by which an optimum is achieved as regards expenditure and function, as is usual in engineering. In view of the high factor of safety and the long life which are required, the cooled composite piston generally meets the requirements at the present state of the art.

The cooled composite piston relies on a separation of materials with a view to the different functions to be performed by different parts of the piston, each material is used in such a manner that only its advantages are obtained, as far as possible. Forged steel, such as steel having the designation 42 CrMo 4 V, is used for the upper part, which is formed with the combustion chamber recess and the piston ring grooves and is subjected to high thermal and mechanical stresses and to abrasion. The lower part comprising the skirt, which is guided in the cylinder, and the piston pin bosses consists in the presently standard piston of a forged eutectic aluminum-silicon alloy so that the low friction and the low specific gravity of aluminum are utilized. The use of screws to connect the two parts has been found to be most desirable. A critical aspect of such structure resides in the fact that aluminum has a higher coefficient of expansion and a lower modulus of elasticity than steel and that its permissible load decreases in the course of operation.

More recently, nodular iron, which has a high strength and elongation, has been used for integral pistons cast from ferrous material. Because nodular iron has a low thermal conductivity and the cooling passage is specially designed, almost all heat which enters the piston is dissipated in the upper one-fourth of the piston so that the skirt and the piston pin bosses assume the temperature if the lubricating oil.

For this reason, it is no longer necessary to design the skirt of pistons of nodular iron with the convex surfaces and complicated oval shapes which are known and required in light alloy pistons.

When the piston heads are formed with unfavorably designed, undercut combustion chambers or when the piston is operated under severe conditions, exposed surface portions of the piston head may be heated above 450° C. so that ferrite will form in the nodular iron and its high strength will be decreased.

SUMMARY OF THE INVENTION

It has been found that in a piston of the type described first hereinbefore this problem can be solved if, in accordance with the invention, the lower part consists of a cast iron-carbon material having a high strength and elongation, preferably of nodular iron, and the upper part has been joined to the lower part by welding with charge carrier rays. It is particularly desirable to weld the parts together by an interlayer of nickel or its alloys.

Such a piston will withstand extremely high thermal and mechanical stresses and is much lighter in weight than in integral piston of nodular iron. Besides, the piston designed according to the invention has the same good running properties as an integral piston. Another advantage resides in the fact that the upper and lower parts can be machined so that a defined wall thickness and a desirable surface finish can be obtained in otherwise inaccessible portions defining the cooling passages. Because the ascast surface can thus be eliminated, the fatigue limit will be increased. As the wall thickness is defined, the minimum weight and the load limit can be precalculated. Besides, the cooling passage can be checked in a simple and reliable manner.

Whereas it has been attempted before to join an upper part of steel by screws to a lower part of nodular iron, the pistons of that type have not been successful so far because the screws and the larger wall thickness adjacent to the screws have substantially added to the weight of the piston, because the screws may come loose and, if they are screwed in from the piston head they may be overheated and because the fixation of the screws involves a considerable expenditure.

BRIEF DESCRIPTION OF THE DRAWING

The invention is illustrated in the FIGURE in a longitudinal section view in the plane of the piston pins and will be explained hereinafter with reference thereto.

DETAILED DESCRIPTION OF THE INVENTION

The upper part 2 of the piston is made of forged steel having the designation X45CrSi9V and is formed with a shallow combustion chamber 1. The upper part is formed on its underside with a peripheral rib 3, which bears on mating surfaces 4 of the lower part 5, which consists of nodular iron having the designation GGG 60. The upper part 2 and the power part 5 have been joined by welding with charge carrier rays, with an interlayer 6 of nickel. The rib 3 constitutes the inner boundary of the cooling passage 9, which is disposed behind the top land 7 and the ring zone 8 and which is open to the interfacial plane. The rib 3 also confines the centrally arranged cooling chamber 10. The coolant supply conduit, not shown, opens into the cooling passage and communicates with the cooling chamber 10 through the cooling passage 9 and the coolant transfer openings 11 in the rib 3. The coolant flows back into the crankcase from the cooling chamber 10 through the drain opening 12.

The piston pin bosses 14 with pin apertures 16 are freely suspended from ribs 13 and are joined to the piston skirt 15 by ribs which are not shown. The skirt 15 of the piston is formed with apertures in register with the piston pin bosses 14.

It will be appreciated that the instant specification and claims are set forth by way of illustration and not limitation, and that various modifications and changes may be made without departing from the spirit and scope of the present invention.

What is claimed is:

1. In a piston for internal combustion engines, such as high-speed, high-duty diesel engines, of the type which has an upper part and a lower part and is formed adjacent to the interface between these parts with at least one cooling passage and in which the upper part consists of forged steel and is formed on its underside with ribs bearing on opposite mating surfaces of the lower part, the improvement wherein: all of the mating surfaces of each part lie in the same plane, the lower part consists of a cast iron-carbon material having a high strength and elongation and is welded to the upper part by charge carrier rays.

2. The piston according to claim 1, wherein the lower part comprises nodular iron.

3. A piston according to claim 1 or claim 2, wherein the upper part is joined to the lower part with an interlayer of nickel.

4. A method for making a piston for internal combustion engines, such as high-speed, high-duty diesel engines, said method comprising: providing a piston having an upper part of forged steel and a lower part of cast iron-carbon material having a high strength and elongation; said piston having at least one cooling passage adjacent the interface between said parts, and ribs on the underside of said upper part bearing on opposite mating surfaces of said lower part; providing all of said mating surfaces of each part in the same plane; and joining said upper part to said lower part by welding with charge carrier rays.

5. The method according to claim 4, wherein the lower part comprises nodular iron.

6. A method according to claim 4 or claim 5, wherein the upper part is joined to the lower part by providing an interlayer of nickel.

* * * * *